US011355155B1

(12) United States Patent
Chen et al.

(10) Patent No.: US 11,355,155 B1
(45) Date of Patent: Jun. 7, 2022

(54) SYSTEM AND METHOD TO SUMMARIZE ONE OR MORE VIDEOS BASED ON USER PRIORITIES

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 0 days.

(21) Appl. No.: 17/317,651

(22) Filed: May 11, 2021

(51) Int. Cl.
| | |
|---|---|
| *H04N 5/92* | (2006.01) |
| *G11B 27/031* | (2006.01) |
| *G06K 9/62* | (2022.01) |
| *G06N 20/00* | (2019.01) |
| *G10L 15/26* | (2006.01) |
| *G10L 21/10* | (2013.01) |
| *G10L 15/22* | (2006.01) |
| *G10L 25/57* | (2013.01) |
| *G06V 20/40* | (2022.01) |
| *H04N 5/93* | (2006.01) |

(52) U.S. Cl.
CPC .......... *G11B 27/031* (2013.01); *G06K 9/6263* (2013.01); *G06N 20/00* (2019.01); *G06V 20/47* (2022.01); *G10L 15/22* (2013.01); *G10L 15/26* (2013.01); *G10L 21/10* (2013.01); *G10L 25/57* (2013.01)

(58) Field of Classification Search
CPC ..... G11B 27/06; G11B 27/005; G11B 27/031; G11B 27/10; G06V 20/47; G06V 20/49; G06F 16/738; G06F 3/0482
USPC ....... 386/285, 278, 281, 280, 287, 239, 240, 386/245
See application file for complete search history.

(56) References Cited

U.S. PATENT DOCUMENTS

| | | | |
|---|---|---|---|
| 5,835,667 A | 11/1998 | Wactlar et al. | |
| 10,541,000 B1 * | 1/2020 | Karakotsios | H04N 21/25891 |

(Continued)

FOREIGN PATENT DOCUMENTS

| | | |
|---|---|---|
| DE | 102006027720 | 12/2007 |
| JP | 2010102393 A * | 5/2010 |

OTHER PUBLICATIONS

International Search Report and Written Opinion of the International Searching Authority for PCT/US2021/032174 dated Feb. 3, 2022, 12 pages.

*Primary Examiner* — Robert Chevalier
(74) *Attorney, Agent, or Firm* — Lowenstein Sandler LLP (57) ABSTRACT

System and method to summarize one or more videos are provided. The system includes a data receiving module configured to receive videos; a video analysis module configured to analyse the one or more videos to generate one or more transcription text output; a building block data module configured to create a building block model and to apply the building block model on analysed videos; a video presentation module configured to present contents of the videos using elements and to present the one or more transcription texts; a video prioritization configured to generate one or more ranking formulas for the videos, to prioritize building block models, upon receiving feedback from users, based on contents and transcription texts; a video summarization module configured to generate a video summary; a video action module configured to choose an action to be performed on the videos based on the feedback received from the corresponding users.

14 Claims, 5 Drawing Sheets

(56) References Cited

U.S. PATENT DOCUMENTS

| | | |
|---|---|---|
| 2002/0093591 A1 | 7/2002 | Yihong et al. |
| 2018/0176661 A1 | 6/2018 | Varndell et al. |
| 2019/0114487 A1* | 4/2019 | Vijayanarasimhan ............... G06V 20/47 |
| 2019/0205395 A1 | 7/2019 | Francesca et al. |
| 2020/0372066 A1 | 11/2020 | Piyush et al. |

* cited by examiner

SYSTEM AND METHOD TO SUMMARIZE ONE OR MORE VIDEOS BASED ON USER PRIORITIES

FIELD OF INVENTION

Embodiments of a present disclosure relate to generating a video summary, more particularly, to a system and method to summarize one or more videos based on user priorities.

BACKGROUND

Video summary or a video synopsis is a presentation of events that enables the review of hours of video footage in a pre-defined amount of time. More specifically, video summary can be described as a brief presentation of contents by merging multiple images or videos. In a conventional approach, a user may create the video summary by manually editing the multiple videos and syncing multiple edited video frames to generate the video summary. However, the conventional approach is time consuming as it is done manually and are prone to miss out the most relevant frames due to human errors. In addition, if there is a requirement of the video summary to be fit into a specific time frame, the user creating the video summary must be skilled in the art and needs to understand the content of the videos to decide on the important factors. Due to these limitations, the conventional approach is less reliable, less efficient and less accurate.

In comparison to the conventional approach, a newer approach is used to create the video summary automatically by a computing device. However, the newer approach does not allow an integration of the videos based on ranking or upon receiving the feedback from the user. As the system is not designed to learn based on certain comments, feedbacks, and reviews the video summary created by the newer approach can lack the accuracy expected by the user. Such limitations make the newer approach limited to only a specific task and thereby less reliable and less efficient, which does not satisfy the requirements and needs of the user.

Hence, there is a need for an improved system and method for creating a video summary based on user priorities to address the aforementioned issues.

BRIEF DESCRIPTION

In accordance with one embodiment of the disclosure, a system to summarize one or more videos. The system includes one or more processors. The system also includes a data receiving module configured to receive one or more videos in at least one form. The system also includes a video analysis module configured to analyse at least one of video, audio, or a combination thereof from the one or more videos received to generate one or more transcription text output associated with the corresponding one or more videos. The system also includes a building block data module configured to create a building block model using one of an artificial intelligence technique, a machine learning technique, or a combination thereof. The building block data module also configured to apply the building block model on one or more analysed videos using an image processing technique to obtain one or more elements from the corresponding one or more videos using one of the artificial intelligence technique, the machine learning technique, or a combination thereof. The system also includes a video presentation module configured to present one or more contents of the one or more videos using the one or more elements. The video presentation module is also configured to present the one or more transcription texts generated by the video analysis module. The system also includes a video prioritization configured to generate one or more ranking formulas for the one or more videos, to prioritize one or more building block models, upon receiving feedback from one or more users, based on one or more contents and one or more transcription texts presented by the video presentation module. The system also includes a video summarization module configured to generate a video summary for the one or more videos based on the feedback received by the one or more users. The system also includes a video action module configured to choose an action to be performed on the one or more videos based on the feedback received from the corresponding one or more users.

In accordance with another embodiment of the disclosure, a method for summarizing one or more videos is provided. The method includes analysing at least one of video, audio, or a combination thereof from the one or more videos received, for generating one or more transcription text output associated with the corresponding one or more videos. The method also includes creating a building block model using one of an artificial intelligence technique, a machine learning technique, or a combination thereof. The method also includes applying the building block model on one or more analysed videos using an image processing technique for obtaining one or more elements from the corresponding one or more videos using one of the artificial intelligence technique, the machine learning technique, or a combination thereof. The method also includes presenting one or more contents of the one or more videos using the one or more elements. The method also includes presenting the one or more transcription texts generated by the video analysis module. The method also includes generating one or more ranking formulas for the one or more videos, for prioritizing one or more building block models, upon receiving feedback from one or more users, based on one or more contents and one or more transcription texts presented. The method also includes generating a video summary for the one or more videos based on the feedback received by the one or more users. The method also includes choosing an action to be performed on the one or more videos based on the feedback received from the corresponding one or more users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for creating a video summary. As used herein, the term 'video summary' may be defined as a presentation of events that enables the review of hours of video footage in a pre-defined amount of time.

Figure 1:
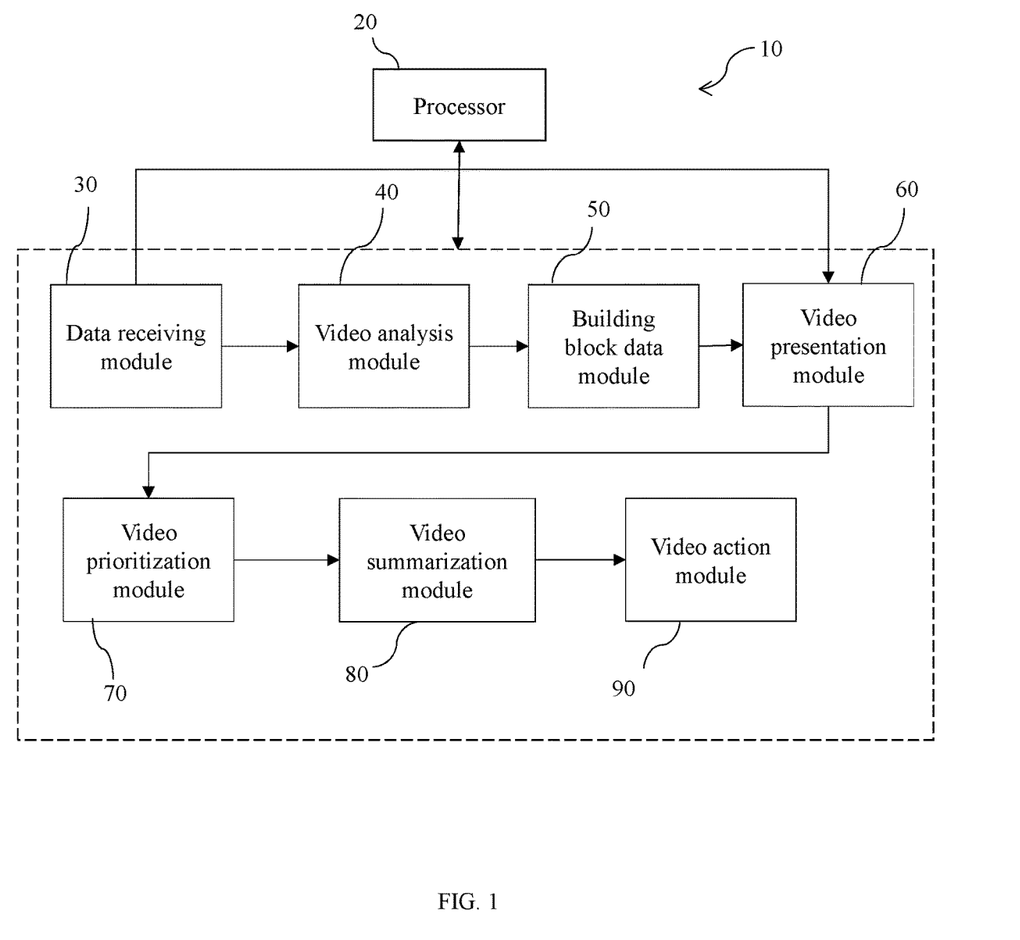
FIG. 1 is a block diagram representation of a system to summarize one or more videos in accordance with an embodiment of the present disclosure.

FIG. 1 is a block diagram representation of a system 10 to summarize one or more videos in accordance with an embodiment of the present disclosure. The system 10 incudes one or more processors 20. The system 10 also includes a data receiving module 30 is configured to receive one or more videos in at least one form. In one embodiment, the at least one form of the one or more videos may include one of a multimedia input, a uniform resource locator (URL) including the one or more videos, a compressed file comprising the one or more videos, or a combination thereof, or the like. In one embodiment, the one or more videos may be representative of an event which may be associated to one or more users. In such embodiment, the event may include a session, a seminar, a meeting, a conference, a call, or the like. In one exemplary embodiment, the one or more videos may be retrieved from one or more sources. In such embodiment, the one or more sources may include at least one of an internal source, an external source or a combination thereof. Here, in one embodiment, the internal source may include a storage unit within the platform. In another embodiment, the internal storage may be a storage unit within a user device through which the corresponding plurality of users may be accessing the platform. In such embodiment, the user device may be a computing device such as a laptop, a tablet, a mobile phone, or the like. Further, in one exemplary embodiment, the one or more external sources may include a storage unit which may not be synced with the platform or with the user device. In such embodiment, the one or more videos may be transmitted to the data receiving module 30 via a communication medium.

The system 10 also includes a video analysis module 40 configured to analyse at least one of video, audio, or a combination thereof from the one or more videos received by the data receiving module 30 to generate one or more transcription text output associated with the corresponding one or more videos. In one embodiment, the one or more videos may be analysed to read one of video data, audio data, or a combination thereof. Further, on analysing the one or more videos, the one or more transcription text output is generated by the video analysis module 40.

Furthermore, the system 10 includes a building block data module 50 configured to create a building block model using one of an artificial intelligence technique, a machine learning technique, or a combination thereof. As used herein, the term "artificial intelligence (AI)" is defined as an intelligence demonstrated by machines to perform or mimic human intelligence and human behavior. Also, the term "Machine learning (ML)" is defined as a study of computer algorithms that improve automatically through experience upon leaning using a built model which is based on a sample set of data. In one exemplary embodiment, the AI technique may include an image processing technique, a natural language processing technique, or the like. In one embodiment, the ML technique may include one of a supervised technique. Also, the term "image processing technique" may be referred as a method or a technique to perform some operations on an image or a video, in order to extract useful information, data or content from the one or more videos.

The building block data module 50 is also configured to apply the building block model on one or more analysed videos using the image processing technique to obtain one or more elements from the corresponding one or more videos using one of the artificial intelligence technique, the machine learning technique, or a combination thereof. In one embodiment, the one or more elements corresponding to the one or more videos may include at least one of gestures, emotions, sentiments, unique audio voice, volume of voice, frequency of voice, images, photos, a best photo portrait, or a combination thereof, associated to one or more entities of the corresponding one or more videos. More specifically, the building block data module may be applied on the one or more videos to process, analyse and obtain the one or more elements from the corresponding one or more videos.

The system 10 further includes a video presentation module 60 configured to present one or more contents of the one or more videos using the one or more elements. In one embodiment, the one or more contents may include at least one of a menu of moments, one or more keywords, one or more highlights, or a combination thereof. In one exemplary embodiment, the one or more contents of the one or more videos may be represented in one of a textual form, a video form, a multimedia form, or the like.

The video presentation module 60 is also configured to present the one or more transcription texts generated by the video analysis module. In one embodiment, the one or more transcription texts may be extracted for the one or more videos from the one or more audio retrieved. In such embodiment, the one or more transcription texts may be represented in one of a textual form, a video form, a multimedia form, or the like.

Furthermore, the system 10 includes a video prioritization module 70 configured to generate one or more ranking formulas for the one or more videos, to prioritize one or more building block models, upon receiving feedback from one or more users, based on one or more contents and one or more transcription texts presented by the video presentation module 60. In one embodiment, the feedback from the one or more users may include feedback for the one or more contents of the one or more videos. Additionally Machine Learning technique or the artificial Intelligence technique may provide the feedback on the selection of the elements from one or more transcription texts associated with the one or more videos presented by the video presentation module 60. In such embodiment, the feedback may include priorities, weightage, ranking or the like of the corresponding one or more videos which may be chosen by the one or more users based on the presents output. In one embodiment, the one or more users may include a person present in the one or more videos, an authorized user, or the like.

The system 10 also includes a video summarization module 80 configured to generate a video summary for the one or more videos based on the feedback received by the one or more users. In one embodiment, the video summary may be generated upon merging the one or more videos based on the feedback. In one exemplary embodiment, a time frame for the video summary may be set by the corresponding one or more users. To fit the video summary into the time frame, the video summarization module 80 may analyse the feedback of the user prior to generating the video summary.

The system 10 further includes a video action module 90 configured to choose an action to be performed on the one or more videos based on the feedback received from the corresponding one or more users. In one embodiment, the action may correspond to playing the video summary in the set time frame, or the like. In one specific embodiment, the system 10 may further include a video editing module configured to edit the video summary on receiving a summary feedback from the one or more users for the generated video summary. In one embodiment, the summary feedback may include an accuracy of the video summary based on the feedback received by the one or more users. In such embodiment, the video summary may be refined to produce a modified video summary.

Figure 2:
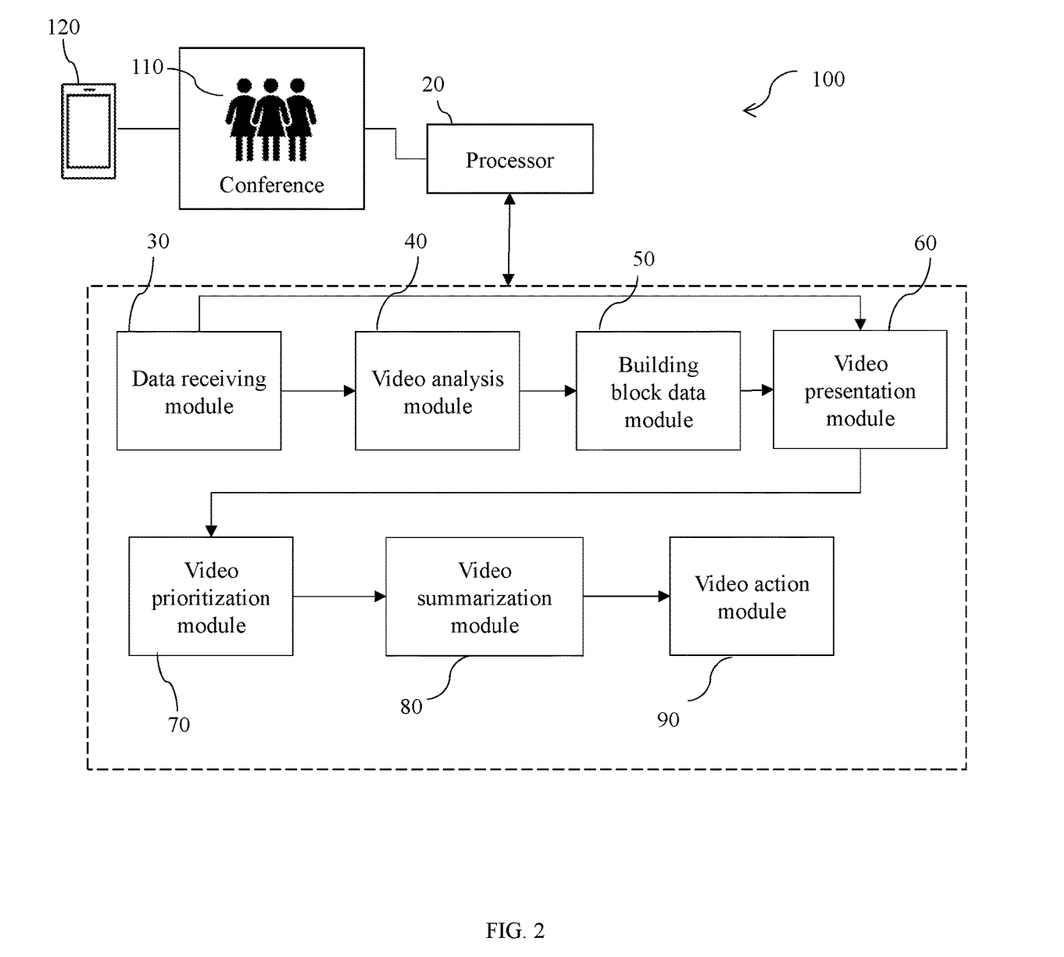
FIG. 2 is a block diagram representation of an exemplary embodiment of the system to create video summary for a conference based on priorities of FIG. 1 in accordance with an embodiment of the present disclosure.

FIG. 2 is a block diagram representation of an exemplary embodiment of the system 100 to create video summary for a conference based on priorities of FIG. 1 in accordance with an embodiment of the present disclosure. Multiple users 110 who have attended the conference and wish to retrieve the video summary of the conference (which we assume to be held on a day 'X' dated 'Y') would register onto the platform via a user device 120. Further, multiple videos are uploaded to a video library database through the multiple user 110 who attended the conference.

Further, the system 100 receives one or more videos from the video library database from a data receiving module 30. The one or more videos are analysed to generate one or more transcription text output associated with the corresponding one or more videos. On receiving the one or more videos, a building block data module creates a building block model using the ML technique and applies the building block model to obtain one or more elements from the one or more videos. Further, one or more contents of the one or more videos associated to the conference are analysed and are presented by a video presentation module 60 which may be used by an authorized user on a screen of the user device 120. Subsequently, one or more transcription texts of the one or more videos are also extracted and are presented in a pre-defined format which can be viewed by the user 110 on the user device 120. On reviewing the same, the user or the Machine Learning Algorithms generates and transmits a list of ranking based on the priorities of the one or more videos associated to the content of the one or more videos by a video prioritization module 70. Further, based on the list of ranking, a video summarization module 80 generates a video summary for the one or more videos of the conference. In addition, a particular time frame of 2 minutes may be set by the user 120 within which the video summary needs to be presented. Based on certain action such as playing of the video summary, chosen by the user 120, a video action module 90 plays the video summary which may be viewed by the user 120 on the user device 110.

It should be noted that, all the above-described modules of FIG. 2 are operable by one or more processors 20. Furthermore, the system 100, the one or more processors 20, the data receiving module 30, the video analysis module 40, the building block data module 50, the video presentation module 60, the video prioritization module 70, the video summarization module 80 and the video action module 90 of FIG. 2 are substantially similar to system 10, one or more processors 20, a data receiving module 30, a video analysis module 40, a building block data module 50, a video presentation module 60, a video prioritization module 70, a video summarization module 80 and a video action module 90 of FIG. 1, and all the embodiments described in FIG. 1 applies to corresponding modules of FIG. 2.

Figure 3:
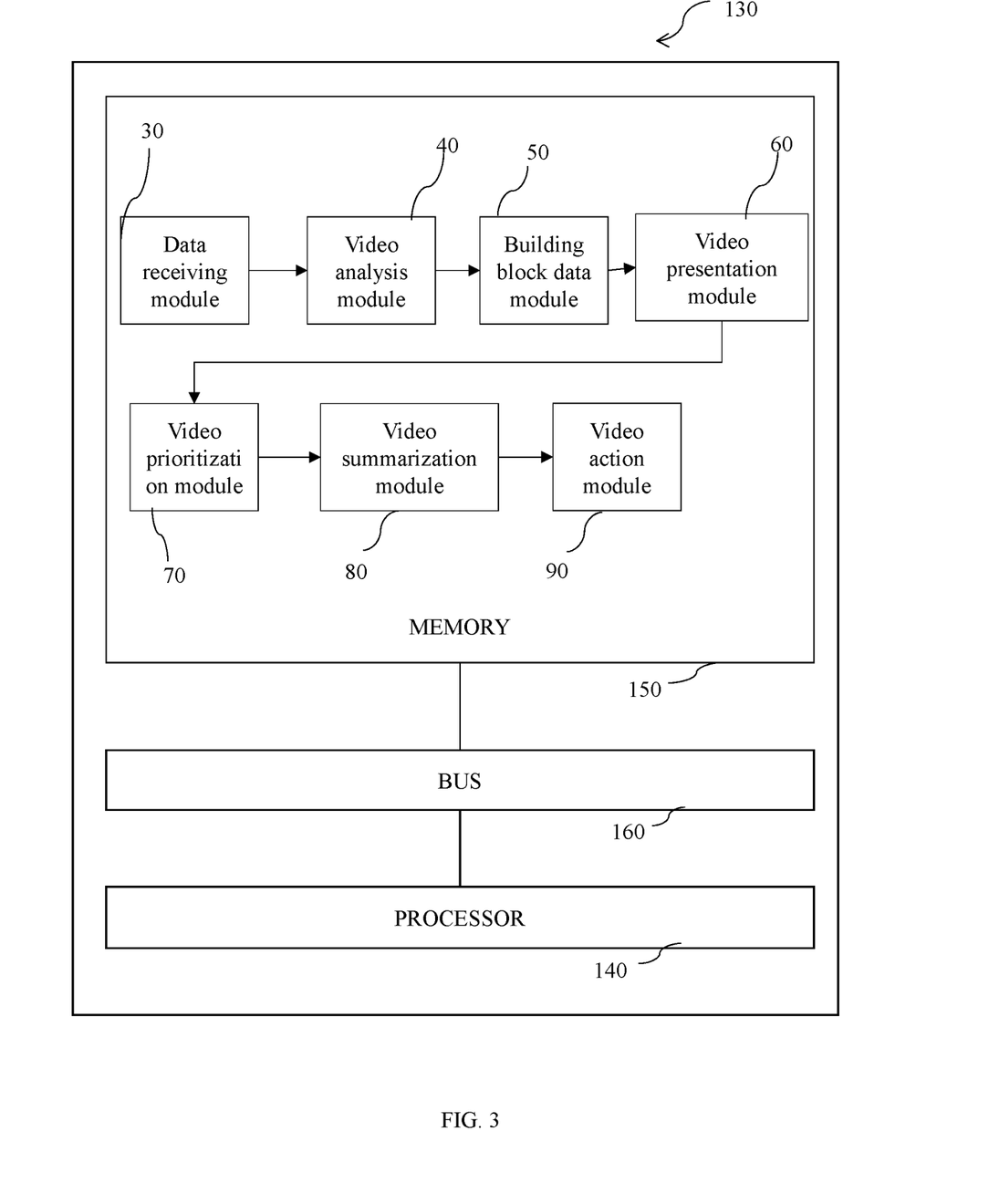
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 130 includes processor(s) 140, and memory 150 operatively coupled to the bus 160.

The processor(s) 140, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
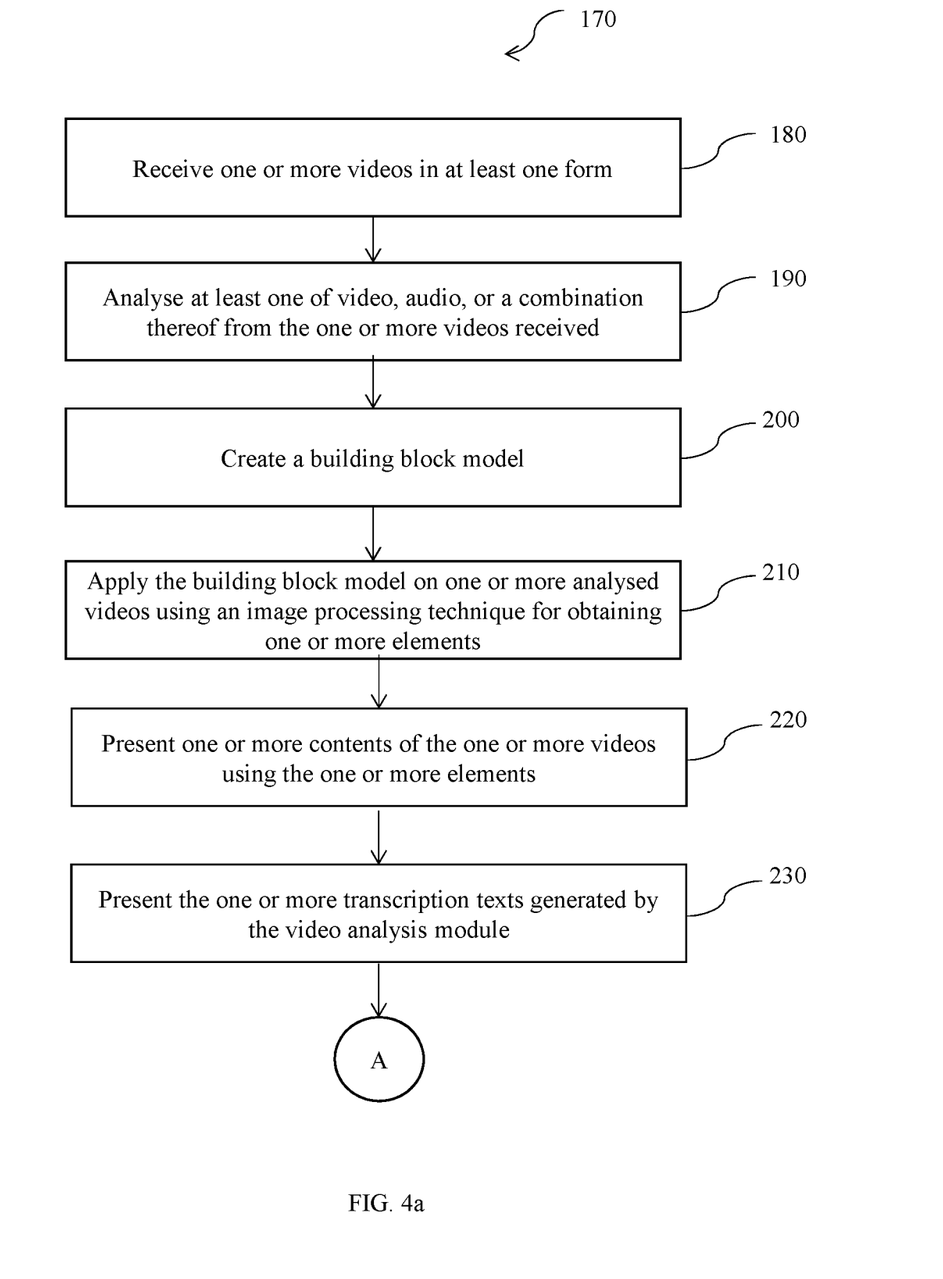
FIG. 4a and FIG. 4b are flow charts representing steps involved in a method for summarizing one or more videos in accordance with an embodiment of the present disclosure.
Figure 4B:
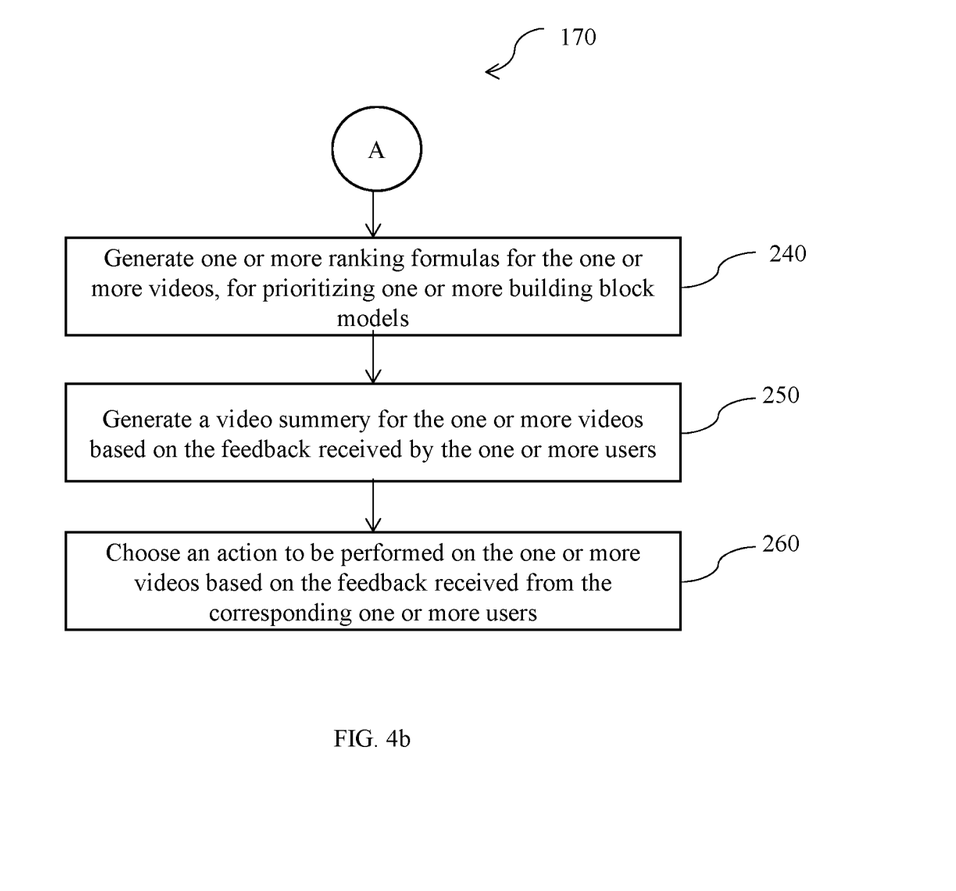

The memory 150 includes a plurality of modules stored in the form of executable program which instructs the processor 140 to perform the method steps illustrated in FIG. 4a and FIG. 4b. The memory 150 is substantially similar to the system 10 of FIG. 1. The memory 150 has the following modules: a data receiving module 30, a video analysis module 40, a building block data module 50, a video presentation module 60, a video prioritization module 70, a video summarization module 80 and a video action module 90.

The data receiving module 30 is configured to receive one or more videos in at least one form.

The video analysis module 40 is configured to analyse at least one of video, audio, or a combination thereof from the one or more videos received by the data receiving module to generate one or more transcription text output associated with the corresponding one or more videos.

The building block data module 50 is configured to create a building block model using one of an artificial intelligence technique, a machine learning technique, or a combination thereof. The building block data module 50 is also configured to apply the building block model on one or more analysed videos using an image processing technique to obtain one or more elements from the corresponding one or more videos.

The video presentation module 60 is configured to present one or more contents of the one or more videos using the one or more elements. The video presentation module 60 is also configured to present the one or more transcription texts generated.

The video prioritization module 70 is configured to generate one or more ranking formulas for the one or more videos, to prioritize one or more building block models, upon receiving feedback from one or more users, based on one or more contents and one or more transcription texts presented.

The video summarization module 80 is configured to generate a video summary for the one or more videos based on the feedback received by the one or more users.

The video action module 90 is configured to choose an action to be performed on the one or more videos based on the feedback received from the corresponding one or more users.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s).

FIG. 4a and FIG. 4b are flow charts representing steps involved in a method 170 for summarizing one or more videos in accordance with an embodiment of the present disclosure. The method 170 includes receiving one or more videos in at least one form in step 180. In one embodiment, receiving the one or more videos may include receiving the one or more videos by a data receiving module. In one exemplary embodiment, receiving the one or more videos may include receiving the one or more videos in one of a multimedia input, a uniform resource locator (URL) comprising the one or more videos, a compressed file comprising the one or more videos, or a combination thereof.

The method 170 also includes analysing at least one of video, audio, or a combination thereof from the one or more videos received, for generating one or more transcription text output associated with the corresponding one or more videos in step 190. In one embodiment, analysing at least one of video, audio may include analysing at least one of video, audio by a video analysis module. In one exemplary embodiment, analysing at least one of video, audio may include analysing at least one of video, audio using one of a machine learning technique, an artificial intelligence technique, or a combination thereof.

Furthermore, the method 170 includes creating a building block model using one of the artificial intelligence technique, the machine learning technique, or a combination thereof in step 200. In one embodiment, creating the building block model may include creating the building block model by a building block data model.

The method 170 further includes applying the building block model on one or more analysed videos using an image processing technique for obtaining one or more elements from the corresponding one or more videos using one of the artificial intelligence technique, the machine learning technique, or a combination thereof in step 210. In one embodiment, applying the building block model on one or more analysed videos may include applying the building block model on one or more analysed videos by the building block data model.

The method 170 also includes presenting one or more contents of the one or more videos using the one or more elements in step 220. In one embodiment, presenting the one or more contents may include presenting the one or more contents by a video presentation module. In one exemplary embodiment, presenting the one or more contents may include presenting at least one of a menu of moments, one or more keywords, one or more highlights, or a combination thereof. In one exemplary embodiment, presenting the one or more contents may include presenting the one or more contents using at least one of gestures, emotions, sentiments, unique audio voice, volume of voice, frequency of voice, images, photos, a best photo portrait, or a combination thereof, associated to one or more entities of the corresponding one or more videos.

The method 170 also includes presenting the one or more transcription texts generated by the video analysis module in step 230. In one embodiment, presenting the one or more transcription texts may include presenting the one or more transcription texts by the video presentation module.

Furthermore, the method 170 includes generating one or more ranking formulas for the one or more videos, for prioritizing one or more building block models, upon receiving feedback from one or more users, based on one or more contents and one or more transcription texts presented in step 240. In one embodiment, generating the one or more ranking formulas may include generating the one or more ranking formulas by a video prioritization module. In one exemplary embodiment, receiving the feedback from the one or more users may include receiving one or more contents of the one or more videos, the one or more transcription texts, associated with the one or more videos presented, by the one or more users.

The method 170 also includes generating a video summary for the one or more videos based on the feedback received by the one or more users in step 250. In one embodiment, generating the video summary may include generating the video summary by a video summarization module. Furthermore, the method 170 includes choosing an action to be performed on the one or more videos based on the feedback received from the corresponding one or more users in step 260. In one embodiment, choosing the action may include choosing the action by a video action module.

In one exemplary embodiment, the method 170 may further include editing the video summary on receiving a summary feedback from the one or more users for the generated video summary. In such embodiment, editing the video summary may include editing the video summary by a video editing module. In such embodiment, receiving the summary feedback may include receiving an accuracy of the video summary, based on the feedback received, by the one or more users.

Various embodiments of the present disclosure enable the system to provide a platform to create the video summary by integrating multiple videos for a specific time frame based on multiple elements and multiple contents and feedback chosen by the user. Also, the system enables the user to review and modify the video summary as per the ranking and priorities and setting the time frame as required by the end user.

Also, since the system uses the machine learning technique and the artificial intelligence technique, the system is more reliable as it learns from every built video summary, thereby making the system understand and provide most accurate video summary for the users to generate the feedback and set the time frame, thereby, the system is highly reliable and highly efficient.

Since the system provides the video summary for a specific time frame, the system provides an opportunity for the user or the end user to obtain the important or the complete gist of the multiple videos thereby saving the viewing and reviewing time of the end user, which makes the system provide a unique approach for generating the video summary.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for summarizing one or more videos, the system comprising:
   one or more processors;
   a data receiving module, operable by the one or more processors, configured to receive one or more videos in at least one form;
   a video analysis module, operable by the one or more processors, configured to analyze video, audio, or a combination thereof from the one or more videos received by the data receiving module to generate a transcription text output associated with each of the corresponding one or more videos;
   a building block data module, operable by the one or more processors, configured to:
      create a building block model using one of an artificial intelligence technique, a machine learning technique, or a combination thereof;
      apply the building block model on one or more analyzed videos using an image processing technique to obtain one or more elements from the one or more analyzed videos;
   a video presentation module, operable by the one or more processors, configured to:
      present content of the one or more videos using the one or more elements; and
      present the transcription text output generated by the video analysis module;
   a video prioritization module, operable by the one or more processors, configured to generate one or more ranking formulas for the one or more videos, to prioritize one or more building block models, upon receiving feedback from at least one user, generation of the ranking formulas based at least in part on content and transcription texts presented by the video presentation module;
   a video summarization module, operable by the one or more processors, configured to generate a video summary for the one or more videos based on the user feedback received; and
   a video action module, operable by the one or more processors, configured to choose an action to be performed on the one or more videos based on the user feedback received.

2. The system of claim 1, wherein the form of the one or more videos comprises a multimedia input, a uniform resource locator (URL) comprising the one or more videos, a compressed file comprising the one or more videos, or a combination thereof.

3. The system of claim 1, wherein the one or more elements corresponding to the one or more videos comprises gestures, emotions, sentiments, unique audio voice, volume of voice, frequency of voice, images, photos, a best photo portrait, or a combination thereof, associated with one or more entities of the one or more videos.

4. The system of claim 1, wherein content of the one or more videos comprises a menu of moments, one or more keywords, one or more highlights, or a combination thereof.

5. The system of claim 1, wherein the user feedback comprises feedback relating to the content or the transcription texts.

6. The system of claim 5, further comprising a video editing module, operable by the one or more processors, configured to edit the video summary based at least in part on the user feedback.

7. The system of claim 6, wherein the user feedback comprises feedback relating to accuracy of the video summary.

8. A method of summarizing one or more videos, the method comprising:
   receiving, by a data receiving module, one or more videos in at least one form;
   analyzing, by a video analysis module, video, audio, or a combination thereof from the one or more videos received to generate a transcription text output associated with each of the corresponding one or more videos;
   creating, by building block data model, a building block model using one of an artificial intelligence technique, a machine learning technique, or a combination thereof;
   applying, by the building block data model, the building block model on one or more analyzed videos using an image processing technique to obtain one or more elements from the one or more analyzed videos;

presenting, by a video presentation module, content of the one or more videos using the one or more elements;

presenting, by video presentation module, the transcription text output generated by the video analysis module;

generating, by a video prioritization module, one or more ranking formulas for the one or more videos, to prioritize one or more building block models, upon receiving feedback from at least one user, wherein generating the ranking formulas is based at least in part on content and transcription texts presented;

generating, by a video summarization module, a video summary for the one or more videos based on the user feedback received; and choosing, by a video action module, an action to be performed on the one or more videos based on the user feedback received.

9. The method of claim 8, wherein the form of the one or more videos comprises a multimedia input, a uniform resource locator (URL) comprising the one or more videos, a compressed file comprising the one or more videos, or a combination thereof.

10. The method of claim 8, wherein the one or more elements corresponding to the one or more videos comprises gestures, emotions, sentiments, unique audio voice, volume of voice, frequency of voice, images, photos, a best photo portrait, or a combination thereof, associated with one or more entities of the one or more videos.

11. The method of claim 8, wherein content of the one or more videos comprises a menu of moments, one or more keywords, one or more highlights, or a combination thereof.

12. The method of claim 8, wherein the user feedback comprises feedback relating to the content or the transcription texts.

13. The method of claim 12, further comprising editing, by a video editing module, the video summary based at least in part on the user feedback.

14. The method of claim 13, wherein the user feedback comprises feedback relating to accuracy of the video summary.

* * * * *